May 31, 1955
S. P. TOUSIGNANT
2,709,565
INDICATOR HOLDER
Filed June 4, 1951
2 Sheets-Sheet 1
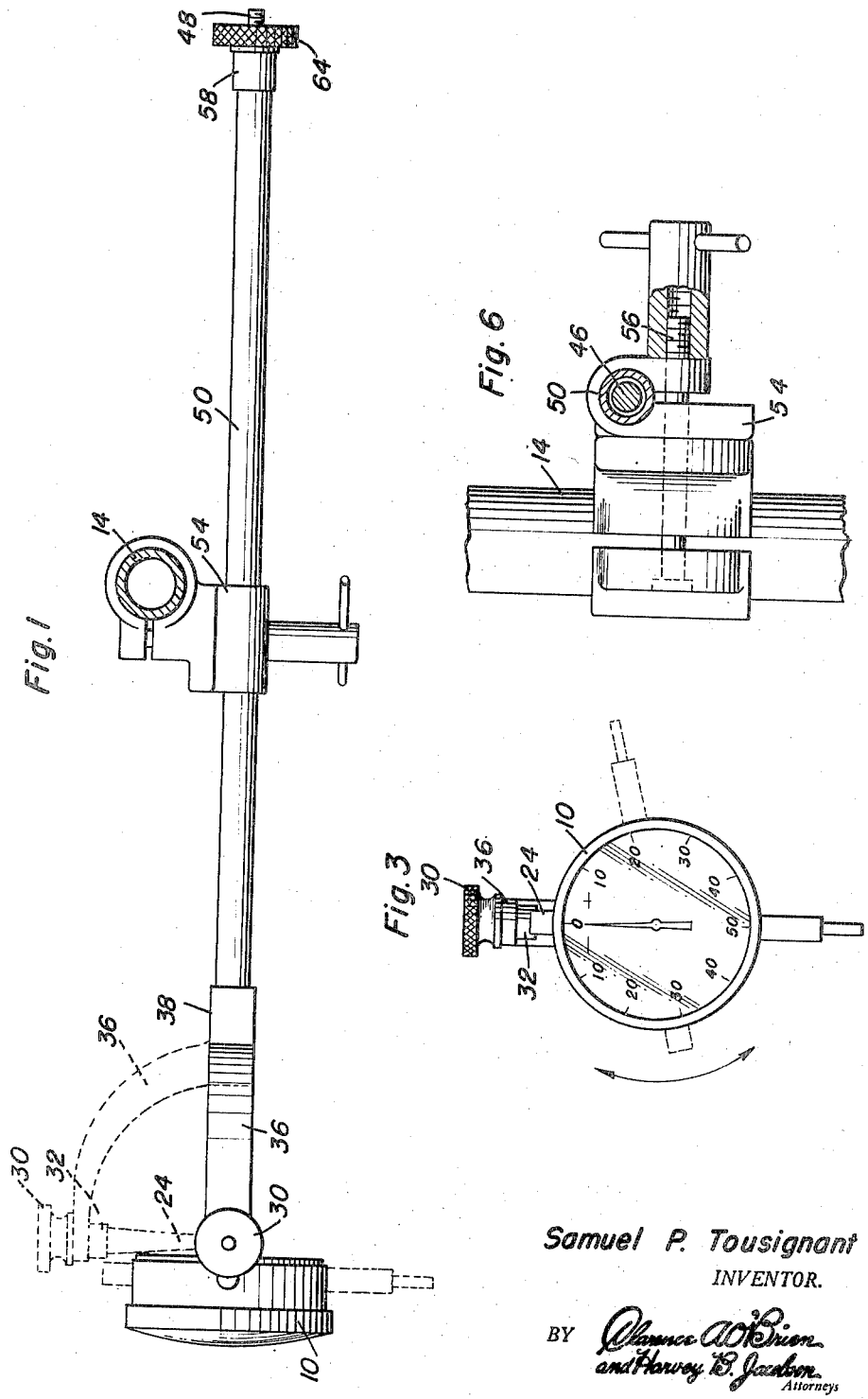
Samuel P. Tousignant
INVENTOR.
BY

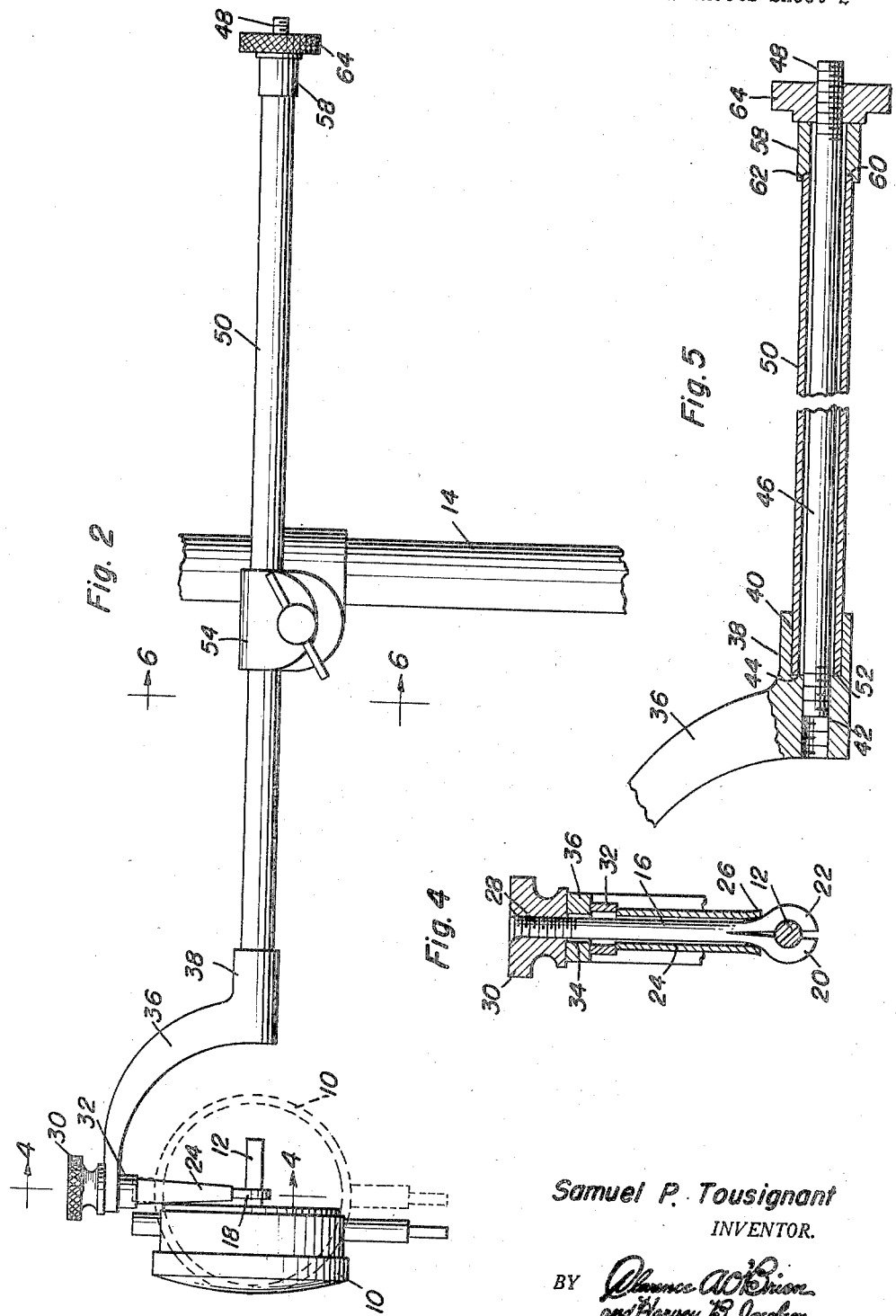

United States Patent Office 2,709,565
Patented May 31, 1955

2,709,565
INDICATOR HOLDER
Samuel P. Tousignant, Portsmouth, Va.
Application June 4, 1951, Serial No. 229,854
1 Claim. (Cl. 248—278)

This invention relates to a holder for a dial indicator and has for its primary object to permit the indicator to be supported in a variety of adjusted positions.

Another object of the invention is to provide a dial indicator holder of the character described in which the adjustments can be made by relatively simple manipulations such as the mere turning of screws.

Yet another object of the invention is to provide a dial indicator holder which is inexpensive, sturdy and easy to removably assemble on a support and on the indicator.

These, together with various ancillary objects and features of the invention which will later become apparent as the following description proceeds, are attained by the device, a preferred embodiment of which has been illustrated by way of example only in the accompanying drawings, wherein:

Figure 1 is a top elevational view of the holder shown supported on a pipe, the latter being shown in section;
Figure 2 is a side elevational view;
Figure 3 is a front elevational view;
Figure 4 is a sectional view taken on the line 4—4 of Figure 2;
Figure 5 is a fragmentary longitudinal sectional view of the holder; and
Figure 6 is a sectional view taken on the line 6—6 of Figure 2.

Specific reference is now made to the drawings. In the several views in the accompanying drawings and in the following specification similar reference characters indicate corresponding elements throughout.

Indicated at 10 is a conventional dial indicator having a laterally extending fixed shaft 12. The present holder is adapted to adjustably mount the said indicator on a pipe or tubular member 14 and includes a rod 16 having a bifurcated lower end 18 embracing said shaft, the bifurcated end having opposed cooperating jaws 20 and 22 capable of being tightened to frictionally secure the shaft. Slidably mounted on the rod is a tube 24 having a somewhat flared lower end 25 adapted to engage the upper portions of the jaws 20 and 22 as shown clearly in Figure 4. The upper end of the rod 16 is threaded as at 28 to receive an internally threaded nut 30. Loosely received on the rod and resting on the upper edge of the tube 24 is a thrust member 32 in the form of a collar. Loosely received as at 34 on the threaded end of the rod between the nut and thrust member is one end of an arcuate arm 36. Thus, when the nut 30 is turned in a counter-clockwise direction and loosened, the lower edge 26 of the tube 26 is made to loosen its grip on the upper portions of the jaws 20 and 22 and the dial indicator carrying the shaft 12 is capable of rotation in a plane about the axis of the shaft as shown in dotted lines in Figure 3. Since such loosening of the nut also causes some separation between it, the arm 36 and the thrust member 32, the rod 16 becomes free to rotate and consequently the dial indicator can rotate with the rod about the longitudinal axis of the rod 16, as shown in dotted lines in Figure 2. Clockwise or tightening movement of the nut will cause the arm 36 to bear on the thrust member 32 which will, in turn, bear on the upper end of the tube 24 and urge its lower edge 26 into tight frictional engagement with the upper portions of the jaws 20 and 22 to close them about the shaft 12. This permits two-way rotational adjustment of the dial indicator.

The other end 38 of the arm 36 includes a lateral enlarged bore 40, see Figure 5, communicative with a reduced internally threaded bore 42 by means of an annular shoulder 44. Threaded in the bore 42 is one end of an elongated rod 46 which is externally threaded at its free opposite end as at 48. Rotatably receiving the rod 46 is a tube or barrel 50 having an inner end 52 adjacent the shoulder 44. Mounted on the tube or barrel is a conventional double split clamp 54 adapted to embrace the pipe 14 and the tube or barrel and to be tightened thereon by means of one elongated screw 56. Thus the barrel or tube may be rotated about the longitudinal axis of the elongated rod 46. To retain the tube in an adjusted position against rotation, a thrust member 58 in the form of a collar is loosely received on the free end of the rod 46 and includes an inner recessed end 60 adapted to abut the outer end 62 of the tube 50. An internally threaded nut 64 is received on the threaded end 48 of the rod behind the thrust member 58. Thus, when the nut 64 is loosened, the thrust member 58 disengages the outer end 62 of the tube or barrel 50 allowing the latter to be rotated about the longitudinal axis of the rod 46. When the nut is tightened, it bears on the thrust member 58, which in turn bears on the outer end 62 of the tube or barrel pushing its inner end 52 into tight frictional engagement with the shoulder 42 in the end 38 of the arm 36 to hold the tube in adjusted position against rotation. Thus the present holder can be easily operated to support the dial indicator in a variety of adjusted positions as needed.

In view of the foregoing description taken in conjunction with the accompanying drawings it is believed that a clear understanding of the device will be quite apparent to those skilled in this art. A more detailed description is accordingly deemed unnecessary.

It is to be understood, however, that even though there is herein shown and described a preferred embodiment of the invention the same is susceptible to certain changes fully comprehended by the spirit of the invention as herein described and the scope of the appended claim.

Having described the invention, what is claimed as new is:

A dial indicator support comprising a tube, an arm rotatably mounted at one end of said tube, adjustable means operatively connected to said arm and said tube for locking said arm against rotation, said arm having an opening therethrough adjacent its free end, a rod rotatably journaled in said opening and extending perpendicular to the longitudinal axis of said tube, expansible means on one end of said rod for rotatably receiving a dial indicator shaft and further means operatively connected to said arm and said rod for contracting said expansible means and locking said rod against rotation, said adjustable means comprising an elongated rod extending through said tube and having one of its ends secured to said arm, the other end of said elongated rod being threaded and having a nut thereon spaced from the other end of said tube, a thrust member insert between the end of said nut causing said arm to frictionally abut said one end of said tube and locking the same against rotation.

(References on following page)

References Cited in the file of this patent

UNITED STATES PATENTS

| | | |
|---|---|---|
| 667,735 | Pease | Feb. 12, 1901 |
| 1,059,217 | Rudy | Apr. 15, 1913 |
| 1,410,608 | Schroth | Mar. 28, 1922 |
| 2,066,699 | Skelton | Jan. 5, 1937 |
| 2,124,006 | Parker | July 19, 1938 |
| 2,243,517 | Adamson | May 27, 1941 |
| 2,304,460 | Kelleher | Dec. 8, 1942 |
| 2,315,260 | Lancaster | Mar. 30, 1943 |
| 2,520,884 | Laube | Aug. 29, 1950 |
| 2,608,192 | Heitmeyer | Aug. 26, 1952 |

FOREIGN PATENTS

| | | |
|---|---|---|
| 615,961 | Germany | of 1935 |